July 10, 1928.

J. I. HAASE 1,676,825

WASHING MACHINE

Filed Nov. 5, 1925

Inventor
Jorgen I. Haase

By O.E.N.Bee.

Attorney

July 10, 1928.

J. I. HAASE

WASHING MACHINE

Filed Nov. 5, 1925

INVENTOR
Jorgen I. Haase
BY
O. E. N Bee.
ATTORNEY

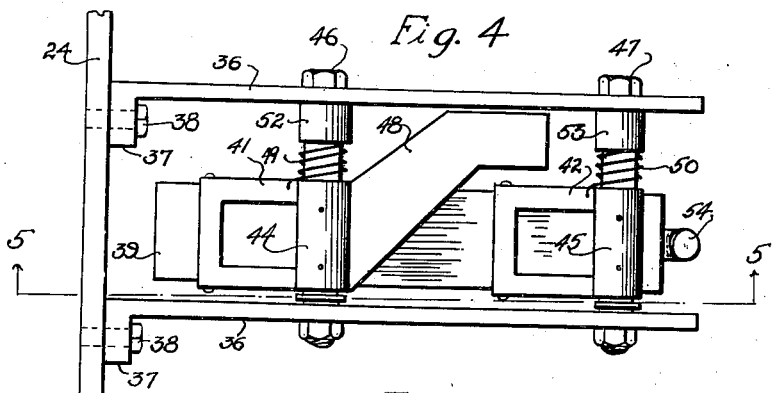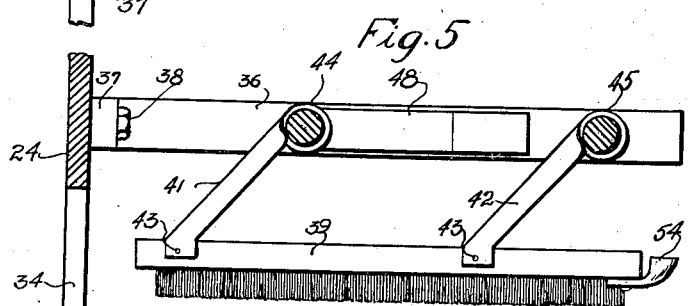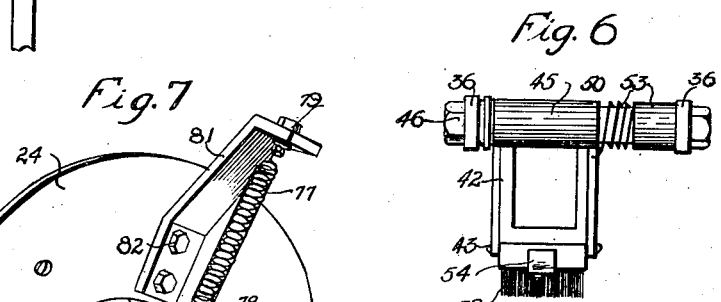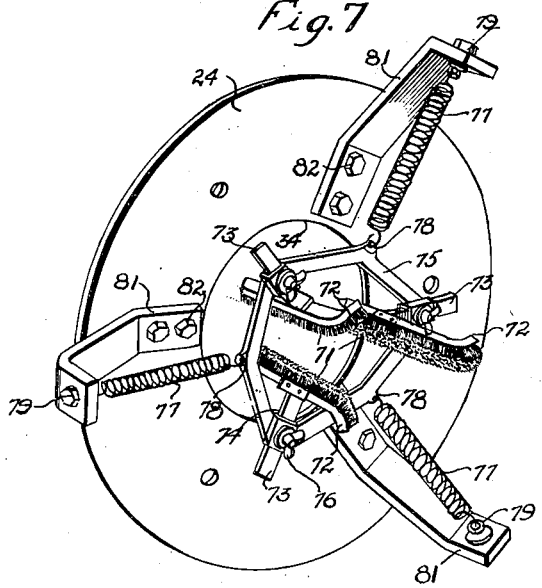

Patented July 10, 1928.

1,676,825

UNITED STATES PATENT OFFICE.

JORGEN I. HAASE, OF AKRON, OHIO, ASSIGNOR TO THE GOODYEAR TIRE & RUBBER COMPANY, OF AKRON, OHIO, A CORPORATION OF OHIO.

WASHING MACHINE.

Application filed November 5, 1925. Serial No. 66,941.

My invention relates to washing machines and it has particular reference to a machine adapted to clean the exterior surface of a hose or tube of resilient material.

It is an object of the invention to provide a machine of the above designated character which shall be simple in construction and efficient in operation.

At one stage in the manufacture of rubber hose, it is necessary to clean powdered material, such as soapstone, from a rubber tube which is to form a core for the hose. According to my invention, this operation is performed by mounting the tube on a straight cylindrical core or mandrel and conducting it through the machine, where it is subjected to the action of cleaning fluid and is suitably scrubbed, so as to emerge in the desired condition.

In the drawings, which show apparatus for practicing the invention:

Fig. 4 is a detail plan view of one of the brushing units;

Fig. 5 is a cross-sectional view taken along the line 5—5 of Fig. 4;

Fig. 6 is an end elevational view of the brushing unit, and;

Fig. 7 is a perspective view of a modified form of a brush assembly.

Figure 1:
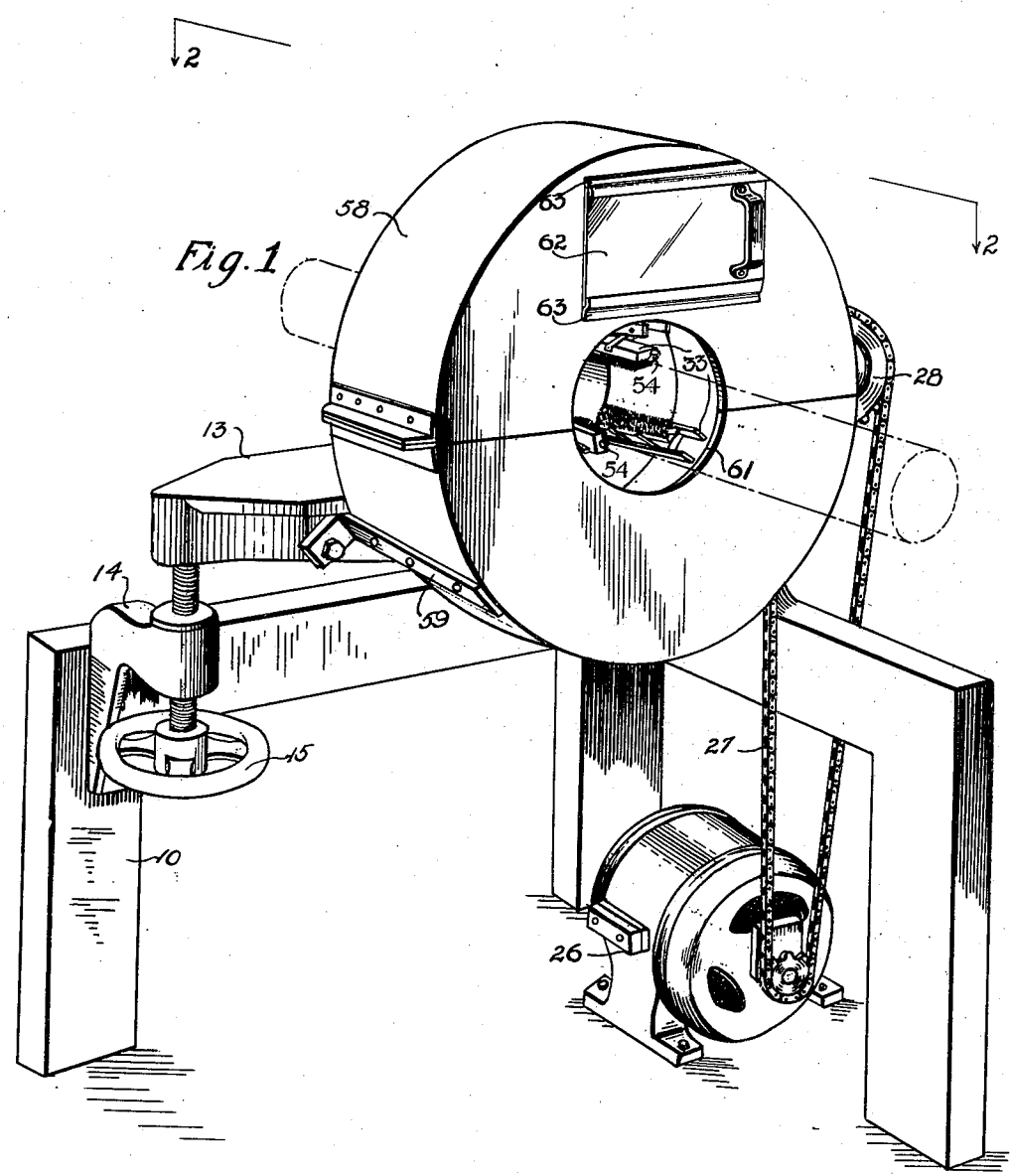
Fig. 1 is a perspective view of the machine.
Figure 2:
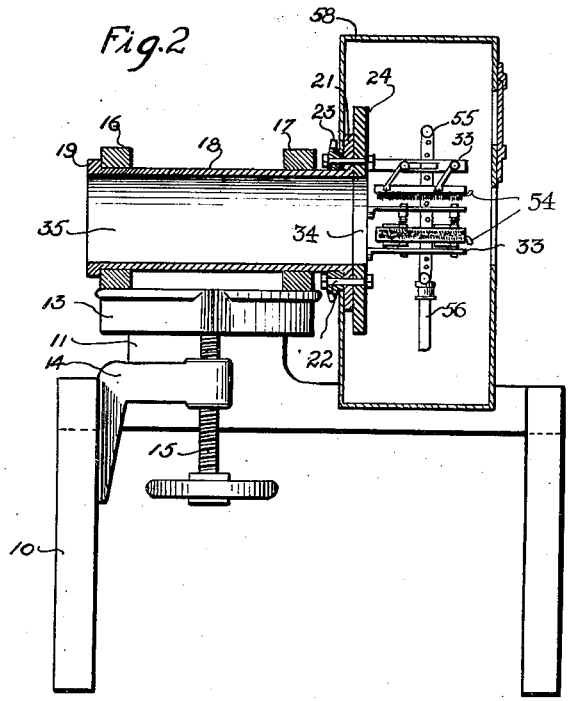
Fig. 2 is a cross-sectional view taken substantially along the line 2—2 of Fig. 1.
Figure 3:
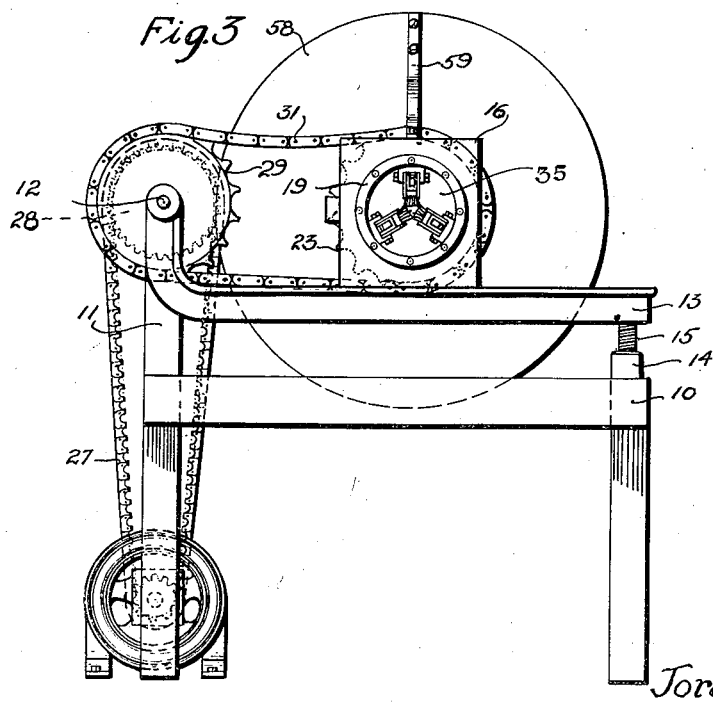
Fig. 3 is an end elevational view of the machine.

The machine comprises a frame 10 having an upstanding portion 11 in which is secured an arbor 12 which provides a pivotal support for a table 13. The opposite portion of the frame 10 has secured thereto a screw threaded boss 14 in which is positioned a screw 15 which adjustably supports the projecting end of the table. Two aligned bearings 16 and 17 mounted upon the table 13 are adapted to rotatably support a hollow cylindrical member 18 of relatively large diameter, which may be properly positioned with respect to the bearings by means of a collar or flange 19, secured to the outer end thereof. The opposite end of the cylinder 18 projects beyond the edge of the table 13, and is provided with an annular flange 21, to the opposite faces of which are secured, by suitable means such as bolts 22, a sprocket wheel 23 mounted upon the cylinder and an annular plate 24 adapted to receive brushing units described in detail hereinafter. The cylinder 18 may be rotated in the bearings 16 and 17 by means of a motor 26, mechanically connected thereto by means of a chain 27 extending to a sprocket wheel 28, loosely mounted upon the arbor 12, and rigidly fixed to a similarly mounted sprocket wheel 29 which is adapted to receive a chain 31 extending to the sprocket wheel 23.

The brushing or scrubbing units, indicated generally by the reference numeral 33, are secured to the outer face of the annular plate 24. In the preferred embodiment of the invention, three units are provided, which are equally spaced about an aperture 34 in the plate 24, which registers with the bore 35 of the cylinder 18. As best illustrated in Figures 4, 5 and 6, each brush unit comprises two brackets 36 provided with angular portions 37 adapted to receive bolts 38 which secure the unit to the plate 24. A brush 39 is loosely mounted upon the brackets 36 by means of angularly disposed links 41 and 42 which are pivoted at their inner ends to the brush, as indicated at 43, and which are provided at their outer ends with cylindrical bushings 44 and 45 respectively surrounding shafts or bolts 46 and 47 extending between the brackets. A counterweight member 48 is secured to the bushing 44 of the link 41 to counteract the effect of centrifugal force which would separate the brushes 33 when the cylinder is rotated, and it is made sufficiently heavy to force the brush toward the longitudinal center line of the cylinder. Coiled springs 49 and 50, which surround the bolts 46 and 47, have their ends secured to the links 41 and 42 and to collars 52 and 53 positioned respectively upon the bolts 46 and 47, and provide a means to force the brushes inwardly at all times, and to hold them in contact when the machine is not in operation. Each brush 39 is provided at its outer end with an upwardly curving lug 54 which acts as a guide for the rubber tube as it is brought into the machine.

A perforated pipe 55, bent into the form of a circular ring, placed in concentric relation with the center line of the cylinder 18 and surrounding the brushes 33, is connected to a suitable reservoir of cleaning fluid (not shown) by means of a conduit 56, and provides a means to flood the tube and brushes during the cleaning operation. The annular plate 24 and its associated parts are covered by a hood 58 secured to the frame 10 by a plurality of brackets 59, to prevent the cleaning fluid from being thrown about or lost. For ease in assembly, and to facilitate inspections, the hood is preferably made in two or more parts, and is provided with an aperture 61 in alignment with the aperture 34 of the plate 24, and with a hand hole which is closed during operation by a lid 62, which is free to slide in guides 63.

A modified brush assembly is shown in Figure 7. Three brushes 71 having outwardly curved ends 72 have secured to the backs thereof upstanding rods 73, which pass through apertures 74 provided at the vertices of a triangular frame 75, and in which they may be adjustably positioned by any suitable means, such as wing nuts 76. The frame 75 is resiliently suspended in a plane in front of the annular plate 24 by means of coiled springs 77, which extend from flanges 78, formed at the mid point of each side of the frame 75, to supporting bolts 79, positioned on outwardly projecting brackets 81 that are equidistantly spaced about the face of the plate, and which may be secured thereto by bolts 82. When this form of brush assembly is employed, the fluid distributing pipe 55 is positioned in front of the brushes 71, so that the tubing is sprayed with fluid before it is acted upon by the scrubbing mechanism.

In operation, a length of rubber tubing, mounted upon a core or mandrel, is conducted to the aperture 61 and into contact with the lugs 54 on the brushes 39, which abut each other by virtue of the pressure, exerted by the springs 49 and 50. If the end of the core is not in alignment with the center line of the cylinder 18, the table 13 may be adjusted by operating the screw support 15, until coincidence is obtained. The motor is then started causing rotation of the cylinder and the brushes, and cleaning fluid, for example, benzine, is allowed to escape through the perforated pipe 55. The brushes, which are still held in contact with each other by the force exerted from the moment of the counterweight member 48, are forced apart as the core is pushed into the machine, an operation which is facilitated by the curved faces of the guide members 54. As the tubing passes through the machine, it is thoroughly sprayed with the cleaning fluid, and is scrubbed by the revolving brushes to remove all of the foreign matter on the surface.

The brush assembly shown in Figure 7 operates in substantially the same manner, except that the tube is washed before it is scrubbed. In this modification it is necessary, of course, to adjust the brushes a proper distance from the center line of the machine, before the tubing is introduced.

From the foregoing description, it will be apparent that there is provided a machine, which, while simple in construction, is efficient in operation, and which rapidly cleans the tubing without excessive loss of cleaning fluid. While but two forms of the invention have been described in detail, it is obvious that those skilled in the art may resort to structural modifications which are within the principles of the invention, which should therefore, be limited only by the scope of the following claims.

What I claim is:

1. A hose washing machine comprising a support having a rotatable member mounted thereon, a plurality of normally contacting brushes resiliently secured to the rotatable member, and means on the brushes to effect their separation as a length of hose is introduced into the machine.

2. The combination with a washing machine having a rotatable annular plate mounted thereon, of a brushing unit comprising a pair of supporting members having a brush pivotally suspended therefrom, resilient means adapted to force the brush away from the supporting members at all times and means to prevent the brush from moving toward the supporting members as the plate is rotated.

3. A hose washing machine comprising a rotatable member having a plurality of brushes yieldably mounted thereon, each brush having a curved portion at the end thereof adjacent the entering work adapted to guide the work between the brushes and to effect a displacement of the brushes around the work, and means to force the brushes toward the axis of revolution of the rotatable member.

4. A washing machine comprising a support having a hollow cylindrical drum mounted thereon, means to rotate the drum about its own axis, a brush supporting member secured to one end of the drum, said member being formed with an aperture in registry with the hollow portion of the drum, brushes mounted on the brush supporting member adapted to contact with work passing through the drum, and means disposed adjacent to the brushes to spray the work.

5. In a hose washing machine, a rotatable brush supporting member, a bracket mounted upon the supporting member, shafts secured in the bracket, links pivoted upon the shafts, a brush secured to the links, and means operatively connected to the brush to counteract the centrifugal force exerted thereupon.

6. In a hose washing machine, a rotatable brush supporting member, a plurality of brackets mounted upon the supporting member, shafts secured in the brackets, links pivoted upon the shafts, a brush secured to the links, means secured to one of the links to counteract the centrifugal force exerted upon the brush, and tensional means connecting the shafts to the links.

In witness whereof, I have hereunto signed my name.

JORGEN I. HAASE.